(12) United States Patent
Lee

(10) Patent No.: US 7,365,722 B2
(45) Date of Patent: Apr. 29, 2008

(54) FOUR COLOR LIQUID CRYSTAL DISPLAY AND DRIVING DEVICE AND METHOD THEREOF

(75) Inventor: Baek-Woon Lee, Yongin (KR)

(73) Assignee: Samsung Electronics Co., Ltd. (KR)

( * ) Notice: Subject to any disclaimer, the term of this patent is extended or adjusted under 35 U.S.C. 154(b) by 453 days.

(21) Appl. No.: 10/659,593

(22) Filed: Sep. 10, 2003

(65) Prior Publication Data

US 2004/0046725 A1  Mar. 11, 2004

(30) Foreign Application Priority Data

Sep. 11, 2002  (KR)  ............... 10-2002-0054925
Jan. 27, 2003  (KR)  ............... 10-2003-0005252

(51) Int. Cl.
*G09G 3/36*   (2006.01)
*G02F 1/1343* (2006.01)
*G09G 5/00*   (2006.01)

(52) U.S. Cl. .................... 345/88; 349/143; 345/690

(58) Field of Classification Search ............ 345/600, 345/603–305, 613, 87–102; 349/56, 82, 349/84, 109, 143, 139
See application file for complete search history.

(56) References Cited

U.S. PATENT DOCUMENTS

| 5,619,225 A * | 4/1997 | Hashimoto | 345/98 |
| 5,929,843 A * | 7/1999 | Tanioka | 345/600 |
| 5,994,721 A * | 11/1999 | Zhong et al. | 257/89 |
| 6,198,516 B1 * | 3/2001 | Kim et al. | 349/39 |
| 6,542,212 B2 * | 4/2003 | Yoshida et al. | 349/141 |
| 6,885,380 B1 * | 4/2005 | Primerano et al. | 345/589 |
| 6,897,876 B2 * | 5/2005 | Murdoch et al. | 345/589 |
| 6,985,194 B2 * | 1/2006 | Kawano et al. | 349/54 |
| 7,164,403 B2 * | 1/2007 | Isami et al. | 345/89 |
| 2002/0122160 A1 * | 9/2002 | Kunzman | 353/31 |
| 2002/0196243 A1 * | 12/2002 | Morita | 345/204 |
| 2003/0034992 A1 * | 2/2003 | Brown Elliott et al. | 345/690 |
| 2004/0178973 A1 * | 9/2004 | Miller et al. | 345/82 |

FOREIGN PATENT DOCUMENTS

JP     2001-296523   * 10/2001

* cited by examiner

*Primary Examiner*—Amr A. Awad
*Assistant Examiner*—Stephen G. Sherman
(74) *Attorney, Agent, or Firm*—Cantor Colburn LLP (57) ABSTRACT

A four color liquid crystal display (LCD) including red, green, blue, and white pixels is provided. The LCD also includes a plurality of gate lines for transmitting gate signals to the pixels and a plurality of data lines for transmitting data signals to the pixels. The LCD further includes a gate driver supplying the gate signals to the gate lines, a data driver supplying the data voltages to the data lines, and an image signal modifier. The image signal modifier includes a data converter converting three-color image signals into four-color image signals, a data optimizer optimizing the four-color image signals from the data converter, a data output unit supplying the optimized image signals to the data driver in synchronization with a clock, and a clock generator generating the clock. The data driver operates in synchronization with the clock.

19 Claims, 8 Drawing Sheets

FOUR COLOR LIQUID CRYSTAL DISPLAY AND DRIVING DEVICE AND METHOD THEREOF

BACKGROUND OF THE INVENTION (a) Field of the Invention

The present invention relates to a liquid crystal display and driving device and method thereof.

(b) Description of Related Art

Generally, a liquid crystal display (LCD) includes a liquid crystal panel assembly including two panels provided with two kinds of field generating electrodes such as pixel electrodes and a common electrode and a liquid crystal layer with dielectric anisotropy interposed therebetween. The variation of the voltage difference between the field generating electrodes, i.e., the variation in the strength of an electric field generated by the electrodes changes the transmittance of the light passing through the LCD, and thus desired images are obtained by controlling the voltage difference between the electrodes.

The LCD includes a plurality of pixels with pixel electrodes and red (RP), green (GP) and blue (BP) color filters. The pixels are driven to perform display operation by way of the signals applied thereto through display signal lines. The signal lines include gate lines (or scanning signal lines) for carrying the scanning signals, and data lines for carrying data signals. Each pixel has a thin film transistor (TFT) connected to one of the gate lines and one of the data lines to control the data signals applied to the pixel electrode.

Meanwhile, there are several types of arrangement of the red (RP), green (GP) and blue (BP) color filters. Examples are a stripe type where the color filters of the same color are arranged in the same pixel columns, a mosaic type where the red, green and blue color filters are arranged in turn along the row and column directions, and a delta type where the pixels are arranged zigzag in the column direction and the red, green and blue color filters are arranged in turn. The delta type correctly represents a circle or a diagonal line.

However, the usual LCD representing one dot by the three RGB colors pixels involves poor optical efficiency. Specifically, the color filters for the respective RGB pixels transmit only one thirds of the light incident thereupon, and hence, the total optical efficiency is deteriorated.

BRIEF SUMMARY OF THE INVENTION

A motivation of the present invention is to solve the problems of the conventional LCD.

A four color liquid crystal display is provided, which includes: a plurality of pixels including three primary color pixels and a white pixel, each pixel including a pixel electrode and a switching element; a plurality of gate lines extending in a row direction for transmitting a gate signal to the switching elements; and a plurality of data lines extending in a column direction for transmitting data signals to the switching elements, wherein the white pixel is smaller than the three primary color pixels.

Preferably, the three primary color pixels include red, green and blue pixels and the green pixel is spaced apart from the white pixel.

An exemplary pixel arrangement is a 2×2 matrix. It is preferable that the blue pixel is larger than the red pixel and the green pixel and the blue pixel and the white pixel are arranged in a diagonal direction.

Alternatively, the pixels are arranged in sequence along the row direction. The sequence of the pixels is preferably the red pixel, the green pixel, the blue pixel, and the white pixel.

The three primary color pixels may have substantially equal size.

At least one portion of the gate lines and the data lines located adjacent to the white pixel may have a width larger than other portions of the gate lines and the data lines. Alternatively, at least one of the gate lines and the data lines located adjacent to the white pixel has a width larger than other of the gate lines and the data lines. Preferably, the at least one portion having the larger width does not intersect other of the gate lines and the data lines or the at least one of the gate lines and the data lines having the larger width has a portion intersecting the other of the gate lines and the data lines and having a width smaller than other portions.

According to an embodiment of the present invention, a device of driving a four color liquid crystal display including a plurality of dots, each dot including red, green, blue, and white pixels, a plurality of gate lines for transmitting gate signals to the pixels, and a plurality of data lines for transmitting data signals to the pixels is provided, which includes: a gate driver supplying the gate signals to the gate lines; a data driver supplying the data voltages to the data lines; and an image signal modifier for converting three-color image signals into four-color image signals, optimizing the four-color image signals, and supplying the optimized image signals to the data driver such that the data driver converts the optimized image signals to the data voltages.

The image signal modifier preferably includes: a data converter converting three-color image signals into four-color image signals; a data optimizer optimizing the four-color image signals from the data converter; a data output unit supplying the optimized image signals to the data driver in synchronization with a clock; and a clock generator generating the clock, the data driver operating in synchronization with the clock.

The optimized image signals (W', R', G', B') for the white, red, green, and blue pixels are determined by one of the following sets of equations:

$$W'=\text{Min}(W_0,255);$$

$$R'=R_0+\text{Max}(0,W_0-255);$$

$$G'=G_0+\text{Max}(0,W_0-255); \text{ and}$$

$$B'=B_0+\text{Max}(0,W_0-255), \quad (1)$$

$$W'=W_0-(255-\text{Max}(R_0,G_0,B_0));$$

$$R'=R_0+(255-\text{Max}(R_0,G_0,B_0));$$

$$G'=G_0+(255-\text{Max}(R_0,G_0,B_0)); \text{ and}$$

$$G'=G_0+(255-\text{Max}(R_0,G_0,B_0)), \text{ and} \quad (2)$$

$$W'=(W_0+\text{Average}(R_0,G_0,B_0))/2;$$

$$R'=R_0+(W_0-\text{Average}(R_0,G_0,B_0))/2;$$

$$G'=G_0+(W_0-\text{Average}(R_0,G_0,B_0))/2; \text{ and}$$

$$B'=B_0+(W_0-\text{Average}(R_0,G_0,B_0))/2, \quad (3)$$

where $W_0$ is an achromatic component of the four-color image signals, $R_0$, $G_0$ and $B_0$ are chromatic components of the four-color signals, Min(x, y) and Max(x, y) are defined as minimum and maximum values between x and y, respectively, Max(x, y, z) is defined as a maximum value among x, y and z, and Average(x, y, z) is defined as an average value of x, y and z.

The data output unit may output the optimized image signals by group of three optimized image signals.

According to another embodiment of the present invention, a device of driving a four color liquid crystal display including a plurality of red, green, blue, and white pixels arranged in a matrix is provided, which includes: a gray voltage generator generating a plurality of gray voltages; an image signal modifier for converting three-color image signals into four-color image signals and selecting one of the three-color image signals and the four-color image signals; and a data driver converting the selected image signals into data voltages selected from the gray voltages and applying the data voltage to the pixels.

The image signal modifier preferably includes: a data converter converting the three-color image signals into the four-color image signals; and a data selector for selecting one of the three-color image signals and the four-color image signals based on a predetermined condition.

The selection of the data selector is based on difference between current image signals and previous image signals. Preferably, the four-color image signals are selected when the difference between the current image signals and the previous image signals is larger than a predetermined value and the three-color image signals are selected when the difference between the current image signals and the previous image signals is equal to or smaller than the predetermined value.

Alternatively, the selection of the data selector is based on a selection signal from an external device and a state of the selection signal is preferably determined by a user. The state of the selection signal may be determined by operation modes of the liquid crystal display and the operation modes include a normal mode and a TV mode.

The data selector may select both a group of the three-color image signals and a group of the four-color image signals. The liquid crystal display may have a PIP (picture-in-picture) function and the selected part of the four-color images signals preferably corresponds to the pixels displaying the PIP.

Alternatively, the four-color image signals are selected when a supply voltage provided for the liquid crystal display is a DC voltage and the three-color image signals are selected when the supply voltage provided for the liquid crystal display is an AC voltage.

The image signal modifier may further include a data optimizer optimizing the four-color image signals from the data converter based on a characteristic of the liquid crystal display and provides the optimized four-color image signals for the data selector. The data selector preferably includes a multiplexer selecting one of the three-color image signals and the four-color image signals based on a selection signal.

The image signal modifier may further include a delay unit delaying the three-color image signals for a predetermined time and supplying the delayed three-color image signals to the multiplexer. The predetermined time is preferably equal to a time for the three-color image signals to reach the multiplexer through the data converter and the data optimizer.

A method of driving a four color liquid crystal display including a plurality of gate lines, a plurality of data lines, and a plurality of red, green, blue, and white pixels arranged in a matrix is provided, which includes: converting three-color image signals into four-color image signals; optimizing the four-color image signals; converting the optimized four-color image signals into data voltages; applying a gate voltage to the gate lines; and applying the data voltages into the data lines.

A method of driving a four color liquid crystal display including a plurality of gate lines, a plurality of data lines, and a plurality of red, green, blue, and white pixels arranged in a matrix is also provided, which includes: converting three-color image signals into four-color image signals; selecting one of the three-color image signals and the four-color image signals; converting the selected image signals into data voltages; applying a gate voltage to the gate lines; and applying the data voltages into the data lines.

The method may further include: optimizing the four-color image signals before the signal selection; and delaying the three-color image signals for a predetermined time before the signal selection.

BRIEF DESCRIPTION OF THE DRAWINGS

The above and other advantages of the present invention will become more apparent by describing preferred embodiments thereof in detail with reference to the accompanying drawings in which.

DETAILED DESCRIPTION OF INVENTION

The present invention now will be described more fully hereinafter with reference to the accompanying drawings, in which preferred embodiments of the inventions are shown.

In the drawings, the thickness of layers and regions are exaggerated for clarity. Like numerals refer to like elements throughout. It will be understood that when an element such as a layer, region or substrate is referred to as being "on" another element, it can be directly on the other element or intervening elements may also be present. In contrast, when an element is referred to as being "directly on" another element, there are no intervening elements present.

Now, LCDs and driving devices and methods thereof according to embodiments of this invention will be described in detail with reference to the accompanying drawings.

Figure 1:
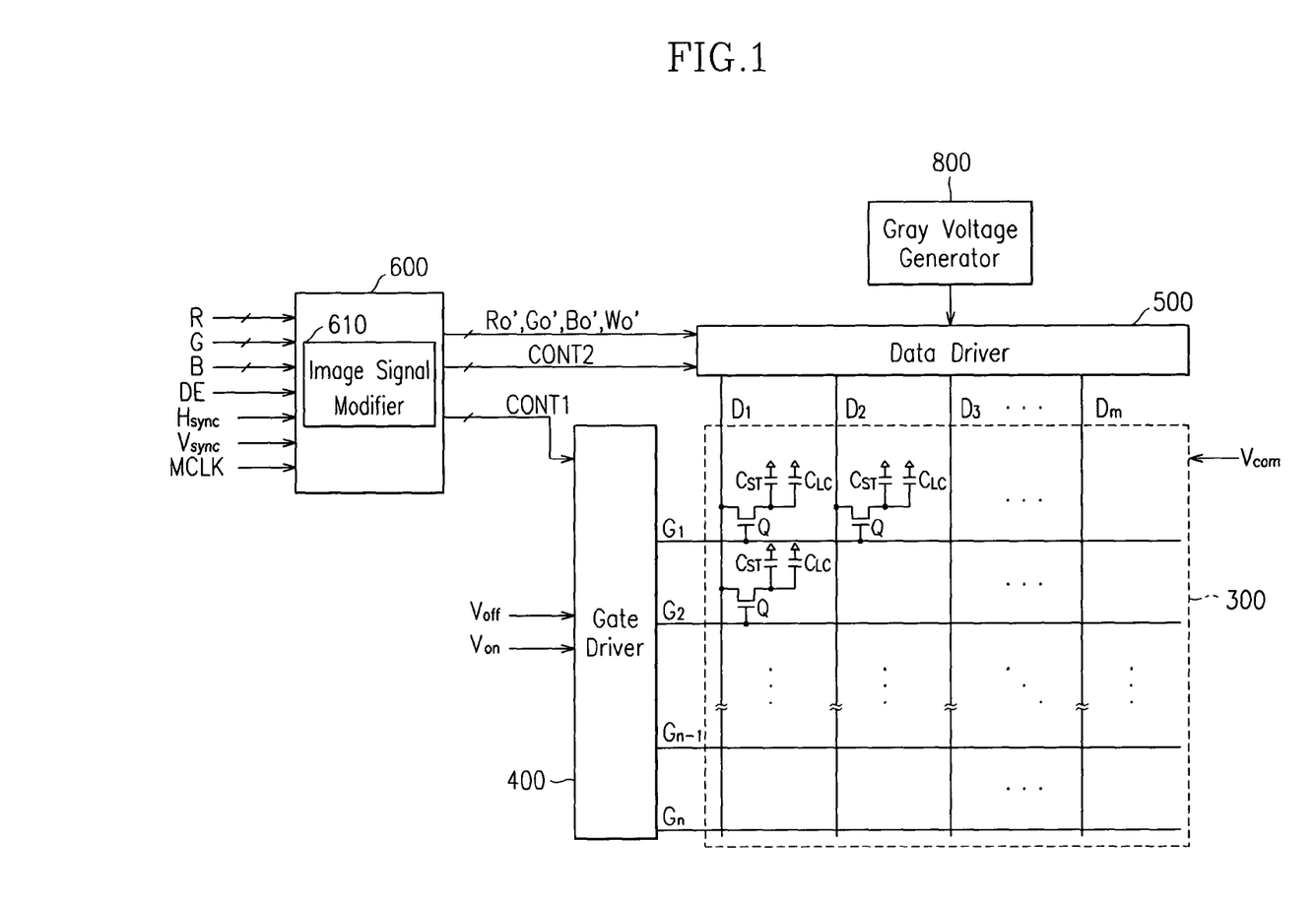
FIG. 1 is a block diagram of an LCD according to an embodiment of the present invention.
Figure 2:
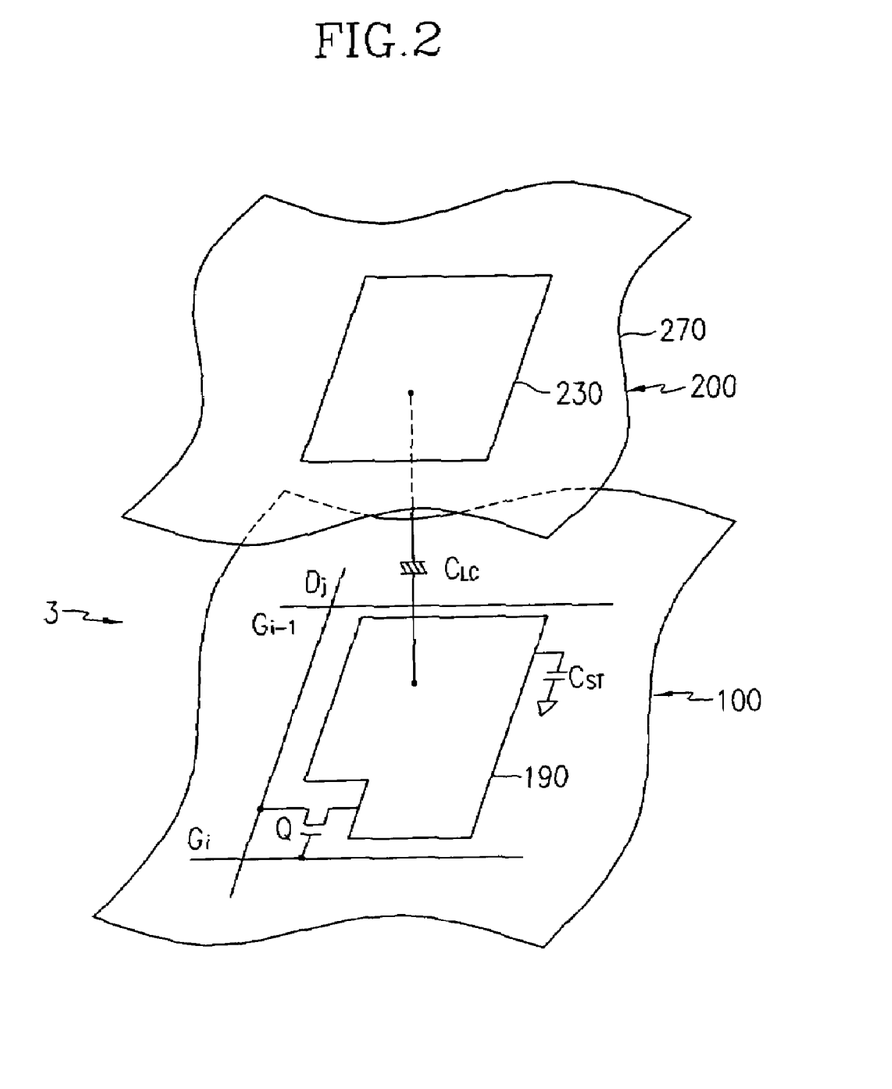
FIG. 2 is an equivalent circuit diagram of a pixel of an LCD according to an embodiment of the present invention.

FIG. 1 is a block diagram of an LCD according to an embodiment of the present invention and FIG. 2 is an equivalent circuit diagram of a pixel of an LCD according to an embodiment of the present invention.

Referring to FIG. 1, an LCD according to an embodiment of the present invention includes a LC panel assembly 300, a gate driver 400 and a data driver 500 which are connected to the panel assembly 300, a gray voltage generator 800 connected to the data driver 500, and a signal controller 600 controlling the above elements.

Figure 3A:
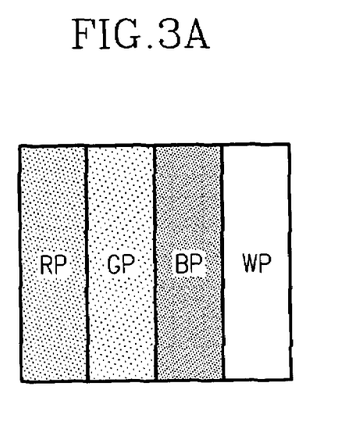
FIGS. 3A-3C illustrate spatial arrangements of pixels of LCDs according to an embodiment of the present invention.

The LC panel assembly 300, in structural view shown in FIG. 3, includes a lower panel 100, an upper panel 200 and a liquid crystal layer 3 interposed therebetween while it includes a plurality of display signal lines $G_1$-$G_n$ and $D_1$-$D_m$ and a plurality of pixels connected thereto and arranged substantially in a matrix in circuital view shown in FIGS. 1 and 2.

The display signal lines $G_1$-$G_n$ and $D_1$-$D_m$ are provided on the lower panel 100 and include a plurality of gate lines $G_1$-$G_n$ transmitting gate signals (called scanning signals) and a plurality of data lines $D_1$-$D_m$ transmitting data signals. The gate lines $G_1$-$G_n$ extend substantially in a row direction and are substantially parallel to each other, while the data lines $D_1$-$D_m$ extend substantially in a column direction and are substantially parallel to each other.

Each pixel includes a switching element Q connected to the display signal lines $G_1$-$G_n$ and $D_1$-$D_m$, and an LC capacitor $C_{LC}$ and a storage capacitor $C_{ST}$ that are connected to the switching element Q. The storage capacitor $C_{ST}$ may be omitted if unnecessary.

The switching element Q such as a TFT is provided on the lower panel 100 and has three terminals: a control terminal connected to one of the gate lines $G_1$-$G_n$; an input terminal connected to one of the data lines $D_1$-$D_m$; and an output terminal connected to the LC capacitor $C_{LC}$ and the storage capacitor $C_{ST}$.

The LC capacitor $C_{LC}$ includes a pixel electrode 190 on the lower panel 100, a common electrode 270 on the upper panel 200, and the LC layer 3 as a dielectric between the electrodes 190 and 270. The pixel electrode 190 is connected to the switching element Q, and the common electrode 270 covers the entire surface of the upper panel 100 and is supplied with a common voltage Vcom. Alternatively, both the pixel electrode 190 and the common electrode 270, which have shapes of bars or stripes, are provided on the lower panel 100.

The storage capacitor $C^{ST}$ is an auxiliary capacitor for the LC capacitor $C_{LC}$. The storage capacitor $C_{ST}$ includes the pixel electrode 190 and a separate signal line (not shown), which is provided on the lower panel 100, overlaps the pixel electrode 190 via an insulator, and is supplied with a predetermined voltage such as the common voltage Vcom. Alternatively, the storage capacitor $C_{ST}$ includes the pixel electrode 190 and an adjacent gate line called a previous gate line, which overlaps the pixel electrode 190 via an insulator.

For color display, each pixel represents its own color by providing one of a plurality of color filters 230 in an area occupied by the pixel electrode 190. The color filter 230 shown in FIG. 2 is provided in the corresponding area of the upper panel 200. Alternatively, the color filter 230 is provided on or under the pixel electrode 190 on the lower panel 100.

The color of the color filter 230 is one of the primary colors such as red, green and blue and white. Hereinafter, a pixel is referred to as red, greed, blue or white pixel based on the color represented by the pixel and indicated by reference numeral RP, GP, BP or WP, which is also used to indicate a pixel area occupied by the pixel. The white pixel WP may have no color filter.

A pair of polarizers (not shown) polarizing incident light are attached on the outer surfaces of the panels 100 and 200 of the panel assembly 300.

Spatial arrangements of pixels of LCDs according to embodiments of the present invention are described with reference to FIGS. 3A to 4C.

Figure 3B:
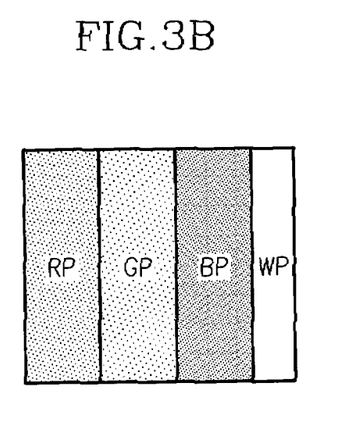
Figure 3C:
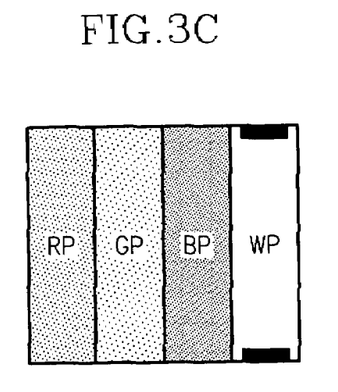

FIGS. 3A-3C illustrate striped arrangements of pixels of LCDs according to an embodiment of the present invention.

Referring to FIGS. 3A-3C, a plurality of pixels are arranged in a matrix including a plurality of pixel row and a plurality of pixel columns.

Each pixel row includes pixels representing four colors, i.e., red pixels RP, green pixels GP, blue pixels BP, and white pixels WP arranged in sequence, while each pixel column includes only one kind of pixels among the four color pixels RP, GP, BP and WP. Although the sequence of the pixels in a pixel row can be altered, it is preferable that the green pixels GP are far from the white pixels WP since the white pixels WP and the green pixels GP has transmittance higher than the red pixels RP and the blue pixels BP.

A group of four pixels shown in FIGS. 3A-3C form a dot, which is an elementary unit for an image.

All pixels shown in FIG. 3A have substantially equal size, while the pixels shown in FIGS. 3B and 3C do not have equal size. Referring to FIGS. 3B and 3C, the white pixel WP is smaller than the red, green and blue pixels RP, GP and BP. The red, green and blue pixels RP, GP and BP may have equal size.

As shown in FIG. 3B, the red, green and blue pixels RP, GP and BP are enlarged and the white pixel WP is reduced, compared with those shown in FIG. 3A. The ratio of the size of the white pixel WP and the size of the red, green and blue pixels RP, GP and BP is determined by considering the luminance of a backlight unit (not shown) and a target color temperature. The size of the white pixel WP may be half or quarter of other pixels RP, GP and BP.

As shown in FIG. 3C, the white pixel WP is reduced while the size of the red, green and blue pixels RP, GP and BP are not changed, compared with those shown in FIG. 3A. The reduction of the white pixel WP is obtained by widening the signal lines such as the gate lines G1-Gn or the data lines D1-Dm (shown in FIGS. 1 and 2) near the white pixel WP or by widening a portion of a black matrix (not shown), which can be provided on the upper panel 200, enclosing the white pixel WP. It is preferable that intersecting area between the gate lines G1-Gm and the data lines D1-Dm is not increased since the intersecting area causes capacitive load to the signal lines.

Figure 4A:
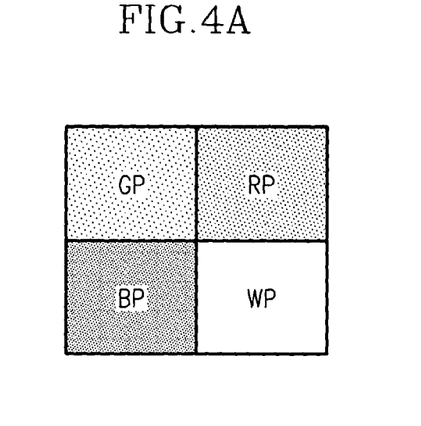
FIGS. 4A-4C illustrate spatial arrangements of pixels of LCDs according to another embodiment of the present invention.
Figure 4B:
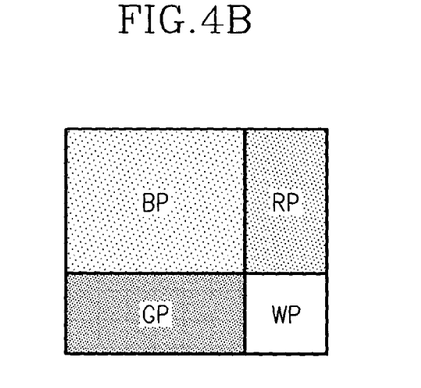
Figure 4C:
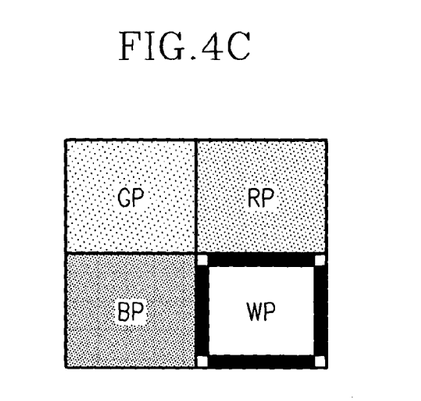

FIGS. 4A-4C illustrate mosaic pixel arrangements of LCDs according to an embodiment of the present invention.

Referring to FIGS. 4A-4C, each pixel row and each pixel column include two kinds of pixels among the four color pixels RP, GP, BP and WP.

Referring to FIGS. 4A and 4C, the pixel rows including the green and red pixels GP and RP and the pixel rows including the blue and white pixels BP and WP are alternately arranged. In view of columns, the pixel columns including the green and blue pixels GP and BP and the pixel columns including the red and white pixels RP and WP are alternately arranged.

Referring to FIG. 4B, the pixel rows including the blue and red pixels BP and RP and the pixel rows including the green and white pixels GP and WP are alternately arranged. In view of columns, the pixel columns including the blue and green pixels BP and GP and the pixel columns including the red and white pixels RP and WP are alternately arranged.

The sequence of the pixels in a pixel row and a pixel column can be also altered and it is still preferable that the green pixels GP are far from the white pixels WP although the green pixels GP and the white pixels WP shown in FIG. 4B are adjacent to each other because of a specific reason described later.

FIGS. 4A-4C show a dot including a group of four pixels forming a 2×2 matrix.

All pixels shown in FIG. 4A have substantially equal size, while the pixels shown in FIGS. 4B and 4C do not have equal size. Referring to FIGS. 4B and 4C, the white pixel WP is smaller than the red, green and blue pixels RP, GP and BP. The red, green and blue pixels RP, GP and BP may have equal or different sizes.

As shown in FIG. 4B, the white pixel WP is reduced and the red, green and blue pixels RP, GP and BP are enlarged and, compared with those shown in FIG. 4A. The mosaic pixel arrangement prevents the red, green and blue pixels RP, GP and BP from being equally enlarged. As described above, the ratio of the size of the white pixel WP and the size of the red, green and blue pixels RP, GP and BP is determined by considering the luminance of a backlight unit and a target color temperature. Since the variation of the amount of the blue light is relatively insensitive to a person compared with red and green light, and hence, the influence of the areal increase of the blue pixel BP on the image quality is relatively small, it is preferable that the increased area of the blue pixel BP is larger than those of the red pixel RP and the green pixel GP and thus the sequence of the pixels are altered as shown in FIG. 4B. The size of the white pixel WP may be quarter of the blue pixel BP and half of the red and green pixels RP and GP.

As shown in FIG. 4C, the white pixel WP is reduced by widening both or either of portions of the gate lines G1-Gn and the data lines D1-Dm (shown in FIGS. 1 and 2) near the white pixel WP. It is also preferable that intersecting area between the gate lines G1-Gm and the data lines D1-Dm is not increased.

These configurations of a four color LCD increase the light transmittance.

Since the red, green and blue color filters transmit one thirds of incident light, the light transmittance of a white pixel WP is about three times that of other color pixels RP, GP and BP. Accordingly, the inclusion of the white pixels WP improves the optical efficiency without increasing the total area of the dot.

Assume that the amount of incident light is one.

For a dot including three pixels, i.e., red, green and blue pixels, the area of each pixel is one thirds of the total area of the dot. Since the light transmittance of the color filter in the pixels is one thirds, the total light transmittance of the dot is equal to $1/3 \times 1/3 + 1/3 \times 1/3 + 1/3 \times 1/3 = 1/3 \approx 33.3\%$.

For a dot shown in FIGS. 3A and 4A, the area of each pixel is a quarter of the total area. Since the light transmittance of the white pixel WP is one, while that of the other pixels RP, GP and BP is one thirds, the total light transmittance of the dot equals to $1/4 \times 1/3 + 1/4 \times 1/3 + 1/4 \times 1/3 + 1/4 \times 1 = 6/12 \approx 50\%$. Accordingly, the brightness is increased to be about 1.5 times compared with a three-color LCD.

In addition, the reduction of the area of the white pixel WP shown in FIGS. 3B, 3C, 4B and 4C reduces deterioration of color level or color saturation (chromaticity), which may occur due to the increase of the luminance.

An exemplary detailed structure of a TFT array panel for an LCD according to an embodiment of the present invention will be described with reference to FIGS. 5 and 6.

Figure 5:
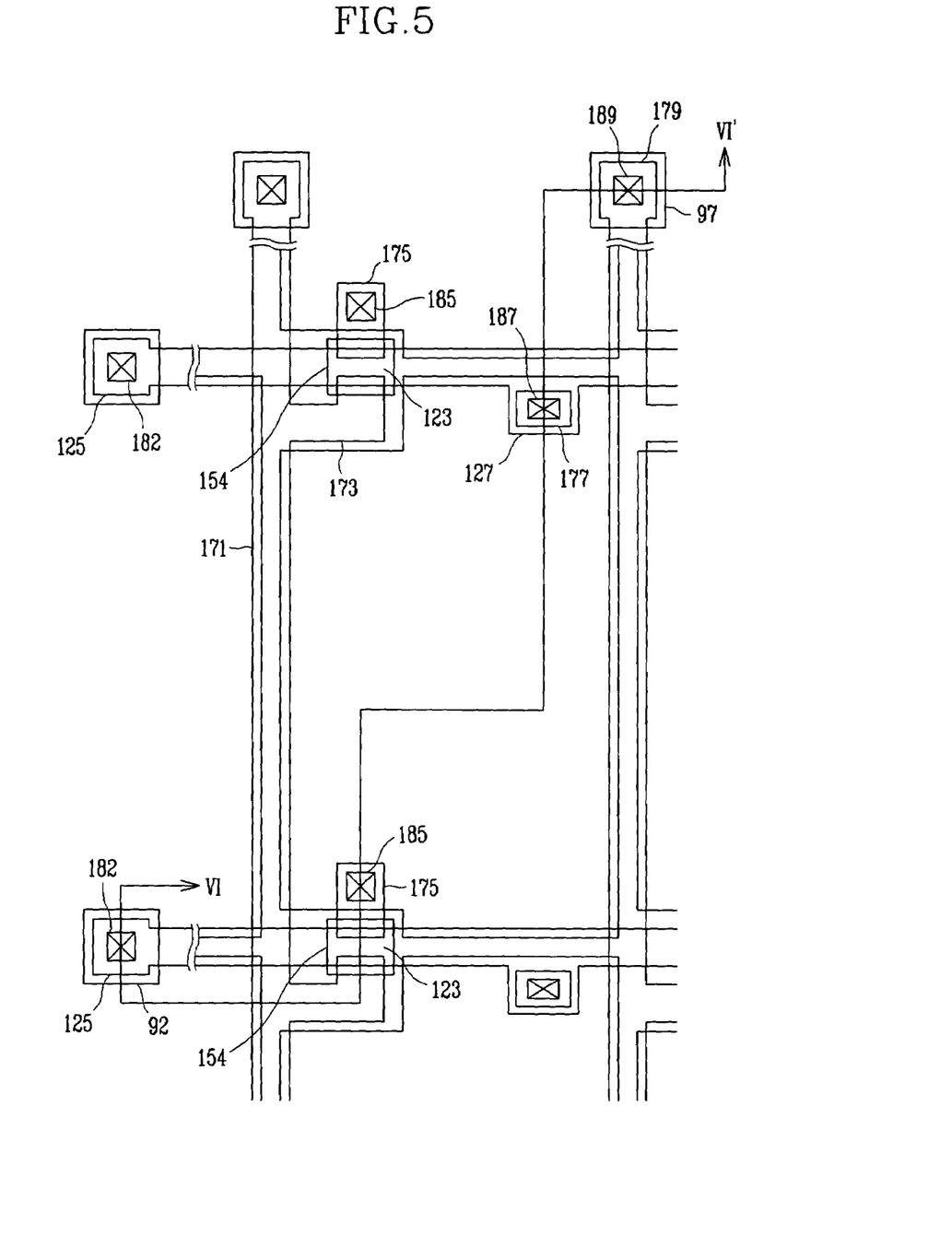
FIG. 5 is a layout view of an exemplary TFT array panel for an LCD according to an embodiment of the present invention.
Figure 6:
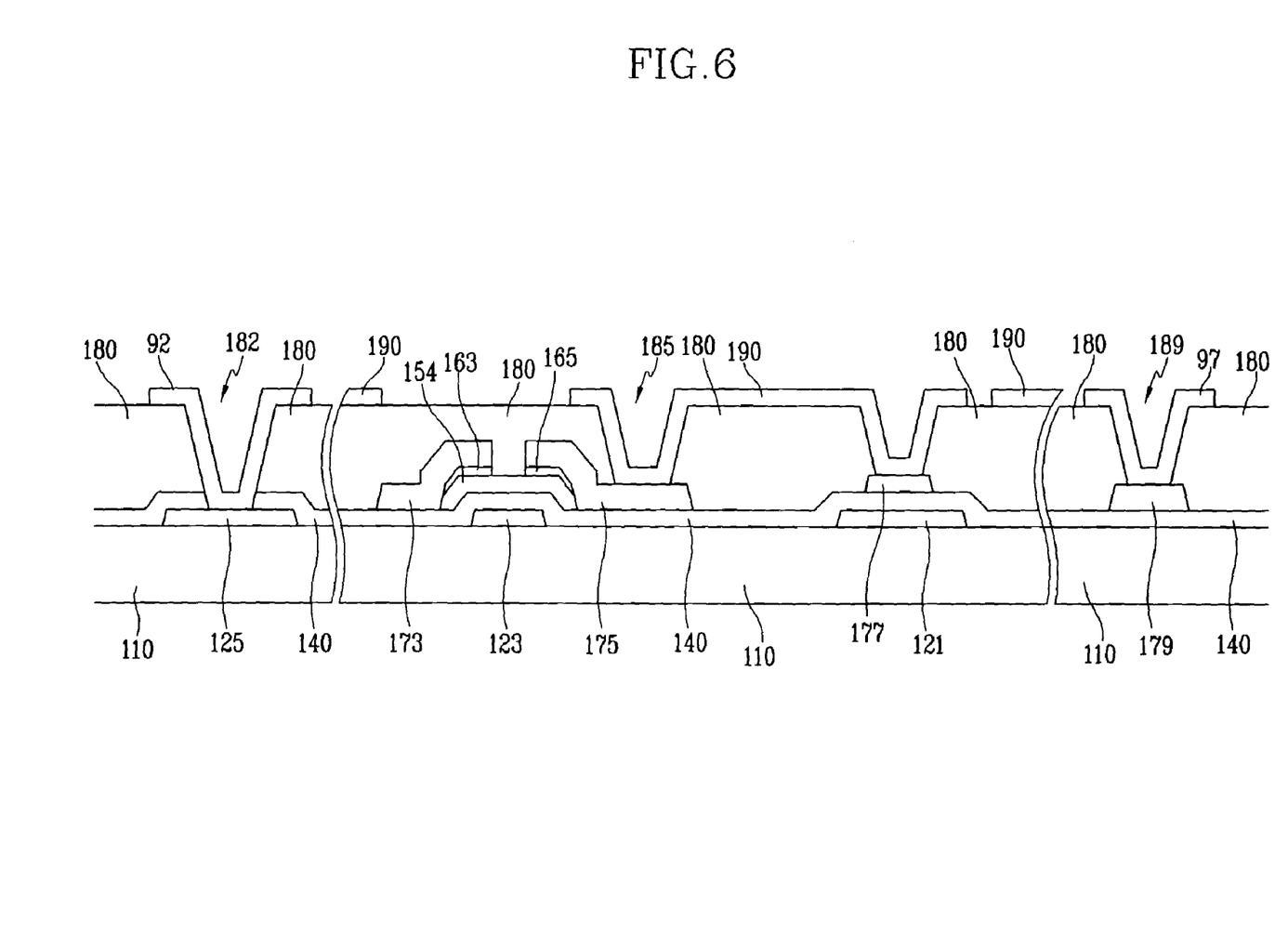
FIG. 6 is a sectional view of the TFT array panel shown in FIG. 5 taken along the line VI-VI'.

FIG. 5 is a layout view of an exemplary TFT array panel for an LCD according to an embodiment of the present invention, and FIG. 6 is a sectional view of the TFT array panel shown in FIG. 5 taken along the line VI-VI'.

A plurality of gate lines 121 for transmitting gate signals are formed on an insulating substrate 110. Each gate line 121 extends substantially in a transverse direction and a plurality of portions of each gate line 121 form a plurality of gate electrodes 123. Each gate line 121 includes a plurality of expansions 127 protruding downward.

The gate lines 121 include a low resistivity conductive layer preferably made of Ag containing metal such as Ag and Ag alloy or Al containing metal such as Al and Al alloy. The gate lines 121 may have a multilayered structure including a low resistivity conductive layer and another layer preferably made of Cr, Ti, Ta, Mo or their alloys such as MoW alloy having good physical, chemical and electrical contact characteristics with other materials such as ITO (indium tin oxide) and IZO (indium zinc oxide). A good exemplary combination of such layers is Cr and Al—Nd alloy.

The lateral sides of the gate lines 121 are tapered, and the inclination angle of the lateral sides with respect to a surface of the substrate 110 ranges about 30-80 degrees.

A gate insulating layer 140 preferably made of silicon nitride (SiNx) is formed on the gate lines 121.

A plurality of semiconductor islands 154 preferably made of hydrogenated amorphous silicon (abbreviated to "a-Si") are formed on the gate insulating layer 140.

A plurality of ohmic contact islands 163 and 165 preferably made of silicide or n+ hydrogenated a-Si heavily doped with n type impurity are formed on the semiconductor islands 154. The ohmic contact islands 163 and 165 are located in pairs on the semiconductor islands 154.

The lateral sides of the semiconductor islands 154 and the ohmic contacts 163 and 165 are tapered, and the inclination angles thereof are preferably in a range between about 30-80 degrees.

A plurality of data lines 171, a plurality of drain electrodes 175, and a plurality of storage capacitor conductors 177 are formed on the ohmic contacts 163 and 165 and the gate insulating layer 140.

The data lines 171 for transmitting data voltages extend substantially in the longitudinal direction and intersect the gate lines 121. A plurality of branches of each data line 171, which extend toward the drain electrodes 175, form a plurality of source electrodes 173. Each pair of the source electrodes 173 and the drain electrodes 175 are separated from each other and opposite each other with respect to a gate electrode 123. A gate electrode 123, a source electrode 173, and a drain electrode 175 along with a semiconductor island 154 form a TFT having a channel formed in the semiconductor island 154 disposed between the source electrode 173 and the drain electrode 175.

The storage capacitor conductors 177 overlap the expansions 127 of the gate lines 121.

The data lines 171, the drain electrodes 175, and the storage capacitor conductors 177 also include a low resistivity conductive layer preferably made of Ag containing metal such as Ag and Ag alloy or Al containing metal such as Al and Al alloy. The data lines 171, the drain electrodes 175, and the storage capacitor conductors 177 may have a multilayered structure including a low resistivity conductive layer and another layer preferably made of Cr, Ti, Ta, Mo or their alloys such as MoW alloy having good physical, chemical and electrical contact characteristics with other materials such as ITO (indium tin oxide) and IZO (indium zinc oxide). A good exemplary combination of such layers is Cr and Al—Nd alloy.

The lateral sides of the data lines 171, the drain electrodes 175, and the storage capacitor conductors 177 are tapered, and the inclination angle of the lateral sides with respect to a surface of the substrate 110 ranges about 30-80 degrees.

The ohmic contacts 163 and 165 interposed only between the underlying semiconductor islands 154 and the overlying data lines 171 and the overlying drain electrodes 175 thereon and reduce the contact resistance therebetween.

A passivation layer 180 is formed on the data lines 171, the drain electrodes 175, the storage conductors 177, and the exposed portions of the semiconductor islands 154. The passivation layer 180 is preferably made of photosensitive organic material having a good flatness characteristic, low dielectric insulating material such as a-Si:C:O and a-Si:O:F formed by plasma enhanced chemical vapor deposition (PECVD), or inorganic material such as silicon nitride. Alternatively, the passivation layer 180 may includes both a SiNX film and an organic film.

The passivation layer 180 has a plurality of contact holes 185, 187 and 189 exposing the drain electrodes 175, the storage conductors 177, and end portions 179 of the data lines 171, respectively. The passivation layer 180 and the gate insulating layer 140 has a plurality of contact holes 182 exposing end portions 125 of the gate lines 121.

A plurality of pixel electrodes 190 and a plurality of contact assistants 92 and 97, which are preferably made of IZO or ITO, are formed on the passivation layer 180.

The pixel electrodes 190 are physically and electrically connected to the drain electrodes 175 through the contact holes 185 and to the storage capacitor conductors 177 through the contact holes 187 such that the pixel electrodes 190 receives the data voltages from the drain electrodes 175 and transmits the received data voltages to the storage capacitor conductors 177.

Referring back to FIG. 2, the pixel electrodes 190 supplied with the data voltages generate electric fields in cooperation with the common electrode 270 on the other panel 200, which reorient liquid crystal molecules in the liquid crystal layer 3 disposed therebetween.

As described above, a pixel electrode 190 and a common electrode 270 form a liquid crystal capacitor $C_{LC}$, which stores applied voltages after turn-off of the TFT Q. An additional capacitor called a "storage capacitor," which is connected in parallel to the liquid crystal capacitor $C_{LC}$, is provided for enhancing the voltage storing capacity. The storage capacitors are implemented by overlapping the pixel electrodes 190 with the gate lines 121 adjacent thereto (called "previous gate lines"). The capacitances of the storage capacitors, i.e., the storage capacitances are increased by providing the expansions 127 at the gate lines 121 for increasing overlapping areas and by providing the storage capacitor conductors 177, which are connected to the pixel electrodes 190 and overlap the expansions 127, under the pixel electrodes 190 for decreasing the distance between the terminals.

The pixel electrodes 190 overlap the gate lines 121 and the data lines 171 to increase aperture ratio but it is optional.

The contact assistants 92 and 97 are connected to the exposed end portions 125 of the gate lines 121 and the exposed end portions 179 of the data lines 171 through the contact holes 182 and 189, respectively. The contact assistants 92 and 97 are not requisites but preferred to protect the exposed portions 125 and 179 and to complement the adhesiveness of the exposed portion 125 and 179 and external devices.

According to another embodiment of the present invention, the pixel electrodes 190 are made of transparent conductive polymer. For a reflective or transflective LCD, the pixel electrodes 190 include opaque reflective metal.

Referring back to FIG. 1, the gray voltage generator 800 generates two sets of a plurality of gray voltages related to the transmittance of the pixels. The gray voltages in one set have a positive polarity with respect to the common voltage Vcom, while those in the other set have a negative polarity with respect to the common voltage Vcom.

The gate driver 400 is connected to the gate lines $G_1$-$G_n$ of the panel assembly 300 and synthesizes the gate-on voltage Von and the gate off voltage Voff from an external device to generate gate signals for application to the gate lines $G_1$-$G_n$.

The data driver 500 is connected to the data lines $D_1$-$D_m$ of the panel assembly 300 and applies data voltages selected from the gray voltages supplied from the gray voltage generator 800 to the data lines $D_1$-$D_m$.

The signal controller 600 controls the drivers 400 and 500, etc., and includes an image signal modifier 610. The image signal modifier 610 may be a stand alone device.

Now, the operation of the LCD will be described in detail.

The signal controller 600 is supplied with three-color image signals R, G and B and input control signals controlling the display thereof such as a vertical synchronization signal Vsync, a horizontal synchronization signal Hsync, a main clock MCLK, and a data enable signal DE, from an external graphic controller (not shown). The image signal modifier 610 of the signal controller 610 converts the three-color image signals R, G and B into four-color image signals and processes and modifies the four-color image signals suitable for the operation of the panel assembly 300 on the basis of the input control signals and the input image signals R, G and B. In addition, the signal controller 600 generates gate control signals CONT1 and data control signals CONT2 for controlling the processed and modified image signals Ro', Go', Bo' and Wo'. The signal controller 600 provides the gate control signals CONT1 for the gate driver 400, and the processed image signals Ro', Go', Bo' and Wo' and the data control signals CONT2 for the data driver 500.

The gate control signals CONT1 include a vertical synchronization start signal STV for informing of start of a frame, a gate clock signal CPV for controlling the output time of the gate-on voltage Von, and an output enable signal OE for defining the width of the gate-on voltage Von. The data control signals CONT2 include a horizontal synchronization start signal STH for informing of start of a horizontal period, a load signal LOAD or TP for instructing to apply the appropriate data voltages to the data lines $D_1$-$D_m$, an inversion control signal RVS for reversing the polarity of the data voltages (with respect to the common voltage Vcom) and a data clock signal HCLK.

The data driver 500 receives a packet of the image data Ro', Go', Bo' and Wo' for a pixel row from the signal controller 600 and converts the image data Ro', Go', Bo' and Wo' into the analog data voltages selected from the gray voltages supplied from the gray voltage generator 800 in response to the data control signals CONT2 from the signal controller 600.

Responsive to the gate control signals CONT1 from the signals controller 600, the gate driver 400 applies the gate-on voltage Von to the gate line $G_1$-$G_n$, thereby turning on the switching elements Q connected thereto.

The data driver 500 applies the data voltages to the corresponding data lines $D_1$-$D_m$ for a turn-on time of the switching elements Q (which is called "one horizontal period" or "1H" and equals to one periods of the horizontal synchronization signal Hsync, the data enable signal DE, and the gate clock signal CPV). Then, the data voltages in turn are supplied to the corresponding pixels via the turned-on switching elements Q.

The difference between the data voltage and the common voltage Vcom applied to a pixel is expressed as a charged voltage of the LC capacitor $C_{LC}$, i.e., a pixel voltage. The liquid crystal molecules have orientations depending on the magnitude of the pixel voltage and the orientations determine the polarization of light passing through the LC capacitor $C_{LC}$. The polarizers convert the light polarization into the light transmittance.

By repeating this procedure, all gate lines $G_1$-$G_n$ are sequentially supplied with the gate-on voltage Von during a frame, thereby applying the data voltages to all pixels. When the next frame starts after finishing one frame, the inversion control signal RVS applied to the data driver 500 is controlled such that the polarity of the data voltages is reversed (which is called "frame inversion"). The inversion control signal RVS may be also controlled such that the polarity of the data voltages flowing in a data line in one frame are reversed (which is called "line inversion"), or the polarity of the data voltages in one packet are reversed (which is called "dot inversion").

An image signal modifier according to an embodiment of the present invention is described in detail with reference to FIGS. 7 and 8.

Figure 7:
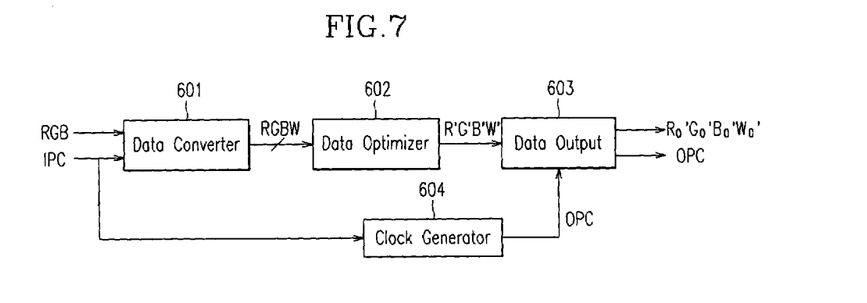
FIG. 7 is an exemplary image signal modifier for an LCD according to an embodiment of the present invention.
Figure 8:
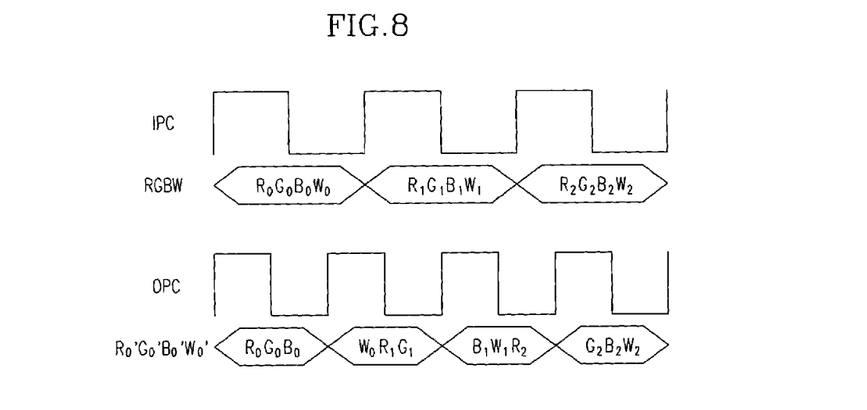
FIG. 8 illustrates exemplary waveforms of signals in the image signal modifier shown in FIG. 7.

FIG. 7 is an exemplary image signal modifier for an LCD according to an embodiment of the present invention and FIG. 8 illustrates exemplary waveforms of signals in the image signal modifier shown in FIG. 7.

An image signal modifier according to an embodiment of the present invention includes a data converter 601 for converting three-color image signals R, G and B into four-color image signals R, G, B and W, a data optimizer 602 for optimizing the four-color image signals R, G, B and W, a data output unit 603 for outputting the optimized image signals R', G', B' and W' in synchronization with a clock OPC, and a clock generator for generating the clock OPC. The output image signals from the data output unit 603 are denoted as Ro', Go', Bo' and Wo'.

The operation of the image signal modifier shown in FIG. 7 is described more in detail.

The data converter 601 converts a set of input red, green and blue image signals R, G and B into a plurality of sets of red, green, blue and white image signals R, G, B and W. The data conversion is made by various techniques. One example is to extract white components from 2-bit three-color image data and to generate four-color image data by half-tone processing. Another example is that a minimum among increments of a set of three-color image data forms a white component and the increments subtracted by the white component are used as the output red, green and blue signals. Detailed description of these examples is omitted since they are known in the art.

In the meantime, there are several ways to make a dot represent a gray. For example, a dot represents the 127-th gray among the zero-th to the 255-th grays by assigning the values (W, RGB)=(0, 255), (1, 254), ..., (127, 127), ..., (254, 1), (255, 0) to the white pixel WP and the red, green and blue pixels RP, GP and BP. That is, there is 256 ways for the dot to represent the 127-th gray.

The data optimizer 602 selects an optimal set among the plurality of sets of four-color image data R, G, B and W considering the characteristics of the LCD such as resolution, power consumption, visibility, etc.

First, the data optimizer 602 distinguishes an achromatic component $W_0$ and chromatic components $R_0$, $G_0$ and $B_0$, which are given by:

$W_0 = W + \text{Min}(R,G,B);$ $R_0 = R - \text{Min}(R,G,B);$ $G_0 = G - \text{Min}(R,G,B);$ and $B_0 = B - \text{Min}(R,G,B).$ (1)

A maximum gray W' of the white pixel WP and associated grays R', G' and B' of the red, green and blue pixels RP, GP and BP for a 256 gray LCD are given by:

$W' = \text{Min}(W_0, 255);$ $R' = R_0 + \text{Max}(0, W_0 - 255);$ $G' = G_0 + \text{Max}(0, W_0 - 255);$ and $B' = B_0 + \text{Max}(0, W_0 - 255).$ (2)

A minimum gray W' of the white pixel WP and associated grays R', G' and B' of the red, green and blue pixels RP, GP and BP a 256 gray LCD are given by:

$W' = W_0 - (255 - \text{Max}(R_0, G_0, B_0));$ $R' = R_0 + (255 - \text{Max}(R_0, G_0, B_0));$ $G' = G_0 + (255 - \text{Max}(R_0, G_0, B_0));$ and $G' = G_0 + (255 - \text{Max}(R_0, G_0, B_0)).$ (3)

When the gray W' of the white pixel WP is intended to be equal to the grays R', G' and B' of the red, green and blue pixels RP, GP and BP, $W' = (W_0 + \text{Average}(R_0, G_0, B_0))/2;$ $R' = R_0 + (W_0 - \text{Average}(R_0, G_0, B_0))/2;$ $G' = G_0 + (W_0 - \text{Average}(R_0, G_0, B_0))/2;$ and $B' = B_0 + (W_0 - \text{Average}(R_0, G_0, B_0))/2.$ (4)

It is preferable that the difference in the grays between the white pixel WP and the other pixels RP, GP and BP is maximized for improving resolution or visibility. For example, the image deterioration due to gray inversion becomes reduced and thus the lateral visibility is improved as the gray difference between the white pixel WP and the other pixels RP, GP and BP becomes large, in particular for a twisted nematic (TN) type LCD. In this case, the selected grays of the respective pixels are determined by Equation 2 or 3.

When representing a gray, the voltage applied to the white pixel WP decreases as the voltage applied to each of the red, green and blue pixels RP, GP and BP increases. Accordingly, the increase of the voltage applied to the white pixel WP makes the decrease of the voltage applied to each of the red, green and blue pixels RP, GP and BP and thus it reduces total power by multiple times. As a result, it is preferable that a voltage applied to the white pixel WP is as large as possible while that applied to each of the other pixels RP, GP and BP is as small as possible. In detail, it is preferable that the gray for the white pixel WP is as large as possible while the grays for the red, green and blue pixels RP, GP and BP are as small as possible for a normally black mode LCD. For a normally white mode LCD, however, it is preferable that the gray for the white pixel WP is as small as possible while the grays for the red, green and blue pixels RP, GP and BP are as large as possible for a normally white mode LCD since the gray voltage becomes large as the gray decreases in a normally white mode LCD. In this case, the selected grays of the respective pixels are determined by Equation 2 or 3.

For an LCD having no serious gray inversion problem or no power consumption problem, it is preferable that the gray of the white pixel WP is similar to the grays of the red, green and blue pixels RP, GP and BP for better image quality. In particular, since the pixels on a screen of a low resolution LCD such as TV may be distinguished, the intensities of the pixels are preferably similar to each other to give uniformity. However, since the luminance of the white pixel WP is much higher than the red, green and blue pixels RP, GP and BP, it is preferable that the gray of the white pixel WP is relatively low compared with the grays of the red, green and blue pixels RP, GP and BP. In this case, the selected grays of the respective pixels are determined by Equation 4.

The above optimization is merely an example, and other optimizations can be applicable considering the highest value of the gray of each pixel, for example, 255.

The data output unit 603 receives the optimized image signals R', G', B' and W' from the data optimizer 602 and provides the output image signals Ro', Go', Bo' and Wo' to the data driver 500 in synchronization with the clock OPC from the clock generator 604. Although the data driver 500 may be specifically designed for a four-color LCD, it is preferable that the driver 500 is a conventional one designed for a three-color LCD, which is commonly available and relatively cheap.

Since the number of the four-color image data is 4/3 times larger than that of the three-color image data, the data processing speed for the four-color image data becomes preferably 4/3 times high compared with that for the three-color image data. Accordingly, the clock generator 604 generates an output clock OPC having a frequency 4/3 times higher than that of an input clock IPC based on the input clock IPC, and the data transmission from the data output unit 603 to the data driver 500 and the data processing in the data driver 500 is synchronized with the output clock OPC.

In addition, the data output unit 603 preferably rearranges the input data R', G', B' and W' according to the characteristics of the data driver 500. For example, when the data driver 500 is designed for a three-color LCD, all the four image data including a set cannot be simultaneously transmitted to the data driver 500 and thus the image data are required to be rearranged.

FIG. 8 shows exemplary waveforms of an input clock IPC, image signals RGBW entering into the data optimizer 602, an output clock OPC, and output image signals R'G'B'W' of the data output unit 603 in a four-color LCD having a striped pixel arrangement shown in FIGS. 3A-3C and a data driver for a three-color LCD.

As shown in FIG. 8, the sequence of the input image data RGBW, i.e., $(R_0G_0B_0W_0)$, $(R_1G_1B_1W_1)$, $(R_2G_2B_2W_2)$, ... is substantially equal to the output image data Ro'Go'Bo'Wo' in the LCD with a striped pixel arrangement, i.e., $(R_0G_0B_0)$, $(W_0R_1G_1)$, $(B_1W_1R_2)$, $(G_2B_2W_2)$. The data enclosed in a parenthesis are transmitted simultaneously.

For a mosaic pixel arrangement shown in FIGS. 4A-4C, the sequence of the output image data Ro'Go'Bo'Wo' is different from that for a striped pixel arrangement. For the arrangements shown in FIGS. 4A and 4C, the sequence of the output image data Ro'Go'Bo'Wo' for adjacent two pixel rows is $(G_0R_0G_1)$, $(R_1G_2R_2)$, ..., $(R_{m-1}G_mR_m)$, $(G_{m+1}R_{m+1}G_{m+2})$, ..., $(G_{(2m-2)}R_{(2m-2)}G_{(2m-1)})$, $(R_{(2m-1)}G_{2m}R_{2m})$, $(B_0W_0B_1)$, $(W_1B_2W_2)$, ..., $(W_{m-1}B_mW_m)$, $(B_{m+1}W_{m+1}B_{m+2})$, ..., $(B_{(2m-2)}W_{(2m-2)}B_{(2m-1)})$, $(W_{(2m-1)}B_{2m}W_{2m})$ while the sequence of the input image data RGBW is $(R_0G_0B_0W_0)$, $(R_1G_1B_1W_1)$, $(R_2G_2B_2W_2)$, ..., $(R_mG_mB_mW_m)$, $(R_{(m+1)}G_{(m+1)}B_{(m+1)}W_{(m+1)})$, ..., $(R_{2m}G_{2m}B_{2m}W_{2m})$. For this data rearrangement, the data output unit 603 preferably includes a line buffer or a line memory for storing image data for a pixel row.

An image signal modifier according to another embodiment of the present invention is described in detail with reference to FIG. 9.

Figure 9:
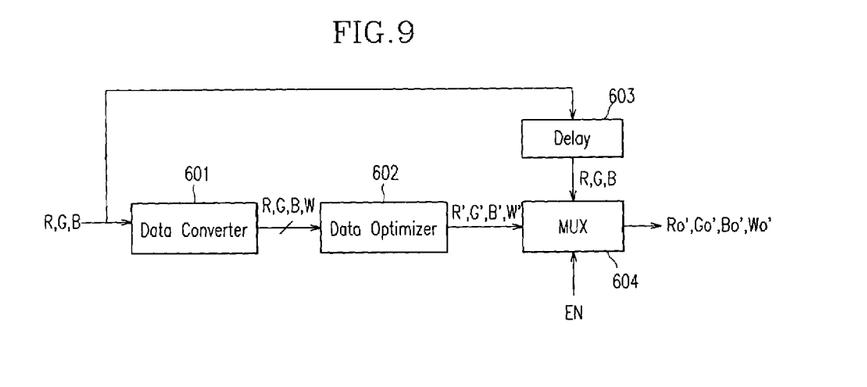
FIG. 9 is an exemplary image signal modifier for an LCD according to another embodiment of the present invention.
Figure 10:
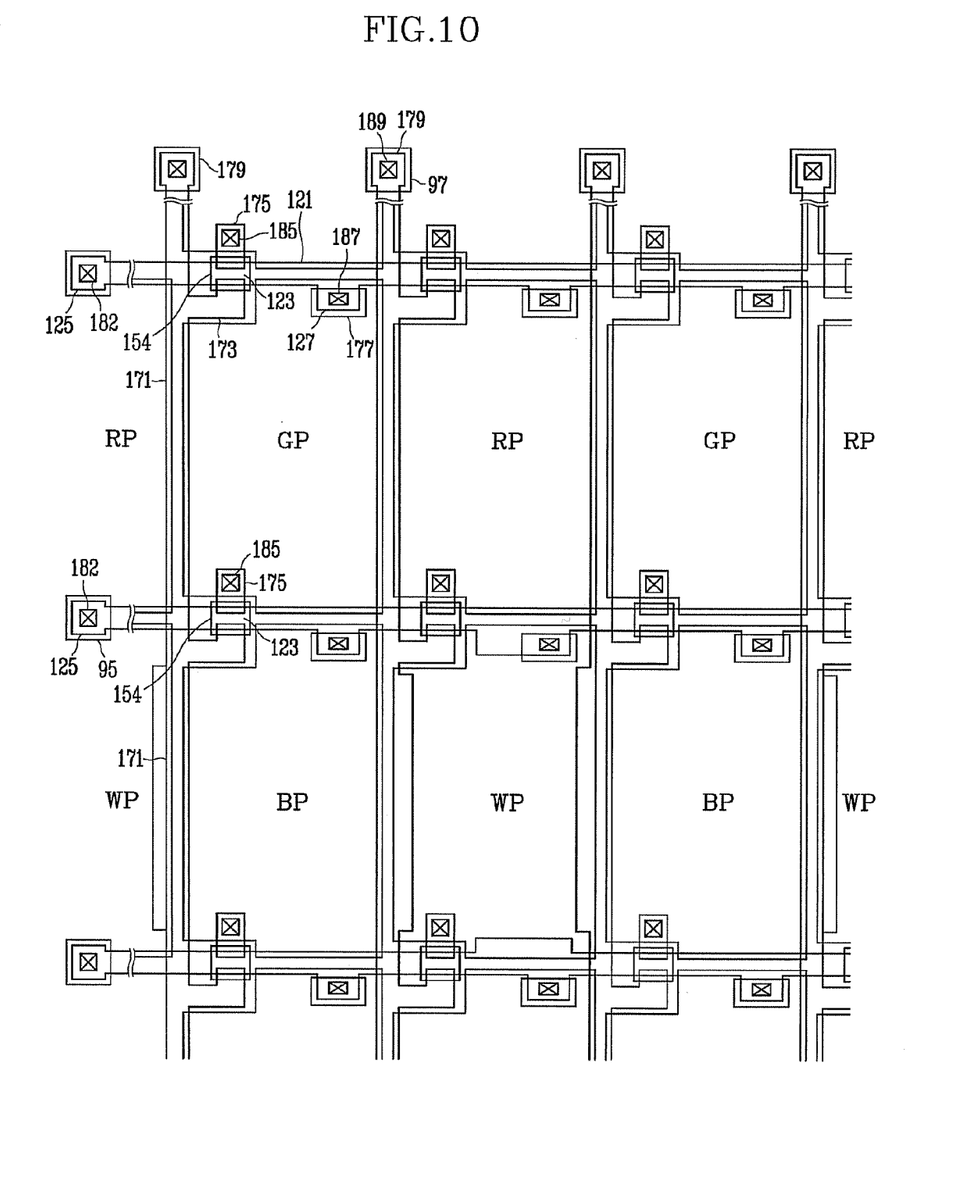
FIG. 10 is an exemplary layout view of a TFT array panel for the LCD supporting pixels shown in FIG. 4C.

FIG. 9 is an exemplary image signal modifier for an LCD according to another embodiment of the present invention.

An image signal modifier according to another embodiment of the present invention includes a data converter 601 for converting three-color image signals R, G and B into four-color image signals R, G, B and W, a data optimizer 602 for optimizing the four-color image signals R, G, B and W, a delay unit (DELAY) 605 for delaying input three-color image signals R, G and B, and a multiplexer (MUX) 606 connected to the data optimizer 602 and the delay unit 605.

The functions of the data inverter 601 and the data optimizer 602 are substantially the same as those shown in FIG. 7.

The delay unit 605 receives the three-color image signals R, G and B, delays the three-color image signals R, G and B for a predetermined time, and provides the delayed three-color image signals R, G and B for the multiplexer 606. The predetermined time is preferably equal to the processing time of the data converter 601 and the data optimizer 602.

The multiplexer 604 selects one of the three-color image signals R, G and B from the delay unit 605 and the four-color image signals R', G', B' and W' from the data optimizer 602 in response to an enable signal EN from the signal controller 600 or an external device.

The level of the enable signal EN is determined by the difference between three-color signals in a current frame (referred to as "current signals" hereinafter) and three-color signals in a previous frame (referred to as "previous signals" hereinafter). For example, if the difference between the current signals and the previous signals is lower than a predetermined value, an image to be displayed is determined to be a still image. On the contrary, if the difference between the current signals and the previous signals is equal to or larger than the predetermined value, an image to be displayed is determined to be a motion image. It is preferable that the three-color images signals are selected for the motion picture, while the four-color images signals are selected for the still picture.

Alternatively, the level of the enable signal EN is determined by a signal from an external device, which is controlled by a user. For example, the user can select a normal mode or a TV mode by using a switch (not shown). A signal from the switch is provided for the multiplexer 606 as the enable signal EN. It is preferable that three-color images signals are selected for the normal mode which mainly displays still images, while four-color images signals are selected for the TV mode, which mainly displays motion images.

The enable signal EN can be controlled such that only a portion of the image signals are four-color signals while the remaining portions are three-color signals. This is useful for an LCD having a PIP (picture-in-picture) function or capable of enhancing the luminance of a portion of a screen.

Alternatively, the selection of the type of the image signals in the multiplexer 606 is determined by a supply voltage type. For example, it is preferable that three-color images signals are selected when using an AC power supply, while four-color images signals are selected when using a portable DC power supply such as battery since the four-color image display consumes less power than the three-color image display with maintaining equal brightness. The supply voltage type can be detected by the signal controller from a state of a backlight unit, which largely contributes to the power consumption of the LCD and is designed to be sensitive to the supply voltage type. Alternatively, the signal controller 600 detects the supply voltage type and selects the types of the image signals as well as it controls the backlight unit based on the supply voltage. For instance, the luminance of the backlight unit follows the selection of four-color image signals to decrease the power consumption when using a portable DC power supply.

To summarize, the four color LCD according to the embodiments of the present invention improves the light efficiency to reduce the power consumption. The appropriate adjustment of the area occupied by the white pixel remains the color chromaticity with still increasing the luminance. In addition, the optimization of four color image signals reduces the power consumption and improves image quality with still using conventional driving circuits such as a gate driver and a data driver. Furthermore, the appropriate selection of three-color image signals and four-color signals can be made considering the image type, user preference, power consumption, etc.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A display device comprising:
    a plurality of pixels including color pixels and a white pixel, each pixel including a pixel electrode and a switching element;
    a plurality of gate lines extending in a first direction for transmitting a gate signal to the switching elements, wherein a first portion of each gate line has a first line width larger than a width of other portions of the respective gate line to form a storage capacitor; and
    a plurality of data lines extending in a second direction for transmitting data signals to the switching elements, wherein a first portion of each data line has a first line width larger than a width of other portions of the respective data line to form a source electrode,
    wherein a second portion of at least one of the gate lines and the data lines located adjacent to the white pixel has a second line width larger than a width of other portions of the respective gate and data lines and smaller than the first line width of the respective gate and data lines;
    wherein the second line width of the second portion of at least one of the gate lines and the data lines of the white pixel is larger than the width of other portions of the respective gate and data lines of the color pixels.

2. The display device of claim 1, wherein the color pixels include red, green and blue pixels.

3. The display device of claim 2, wherein the green pixel is spaced apart from the white pixel.

4. The liquid crystal display of claim 1, wherein the pixels are arranged in a 2×2 matrix.

5. The liquid crystal display of claim 4, wherein the three primary color pixels include red, green and blue pixels and the blue pixel is larger than the red pixel and the green pixel.

6. The liquid crystal display of claim 5, wherein the blue pixel and the white pixel are arranged in a diagonal direction.

7. The display device of claim 1, wherein the pixels are arranged in sequence along the first direction.

8. The display device of claim 7, wherein the color pixels include red, green and blue pixels and the red pixel, the green pixel, the blue pixel, and the white pixel are arranged in sequence.

9. The display device of claim 1, wherein the color pixels have substantially equal size.

10. The display device of claim 1, wherein the gate lines intersect the data lines and the at least one portion having the larger line width does not directly intersect other larger line width portions of the respective gate and data lines.

11. The display device of claim 1, wherein the white pixel is smaller than the color pixels.

12. The display device of claim 1, wherein the second portion of the at least one of the gate lines and the data lines does not correspond to a gate or drain electrode.

13. A device of driving a display device comprising:
    a plurality of dots, each dot including red, green, blue, and white pixels, a plurality of gate lines for transmitting gate signals to the pixels, and a plurality of data lines for transmitting data signals to the pixels, wherein a first portion of each gate line has a first line width larger than a width of other portions of the respective gate line to form a gate electrode, a first portion of each data line has a first line width larger than a width of other portions of the respective data line to form a source electrode and a second portion of at least one of the gate lines and the data lines located adjacent to the white pixel has a second line width larger than a width of other portions of the respective gate lines and the data lines and smaller than the first line width of the respective gate and data lines, the device comprising:
    a gate driver supplying the gate signals to the gate lines;
    a data driver supplying the data voltages to the data lines; and
    an image signal modifier for converting three-color image signals into four-color image signals, optimizing the four-color image signals, and supplying the optimized image signals to the data driver such that the data driver converts the optimized image signals to the data voltages
    wherein the second line width of the second portion of at least one of the gate lines and the data lines of the white pixel is larger than the width of other portions of the respective gate and data lines of the other pixels.

14. The device of claim 13, wherein the image signal modifier comprises:
    a data converter converting three-color image signals into four-color image signals;
    a data optimizer optimizing the four-color image signals from the data converter;
    a data output unit supplying the optimized image signals to the data driver in synchronization with a clock; and
    a clock generator generating the clock, the data driver operating in synchronization with the clock.

15. The device of claim 14, wherein the optimized image signals (W', R', G', B') for the white, red, green, and blue pixels are determined by:

$$W'=\text{Min}(W_0, 255);$$
$$R'=R_0+\text{Max}(0, W_0-255);$$
$$G'=G_0+\text{Max}(0, W_0-255); \text{ and}$$
$$B'=B_0+\text{Max}(0, W_0-255),$$

where $W_0$ is an achromatic component of the four-color image signals, $R_0$, $G_0$ and $B_0$ are chromatic components of the four-color signals, and Min(x, y) and Max(x, y) are defined as minimum and maximum values between x and y, respectively.

16. The device of claim 14, wherein the optimized image signals (W', R', G', B') for the white, red, green, and blue pixels are determined by:

$$W'=W_0(255-\text{Max}(R_0, G_0, B_0));$$
$$R'=R_0+(255-\text{Max}(R_0, G_0, B_0));$$
$$G'=G_0+(255-\text{Max}(R_0, G_0, B_0)); \text{ and}$$
$$B'=B_0+(255-\text{Max}(R_0, G_0, B_0)),$$

where $W_0$ is an achromatic component of the four-color image signals, $R_0$, $G_0$ and $B_0$ are chromatic components of the four-color signals, and Max(x, y, z) is defined as a maximum value among x, y and z.

17. The device of claim 14, wherein the optimized image signals (W', R', G', B') for the white, red, green, and blue pixels are determined by:

$$W'=(W_0+\text{Average}(R_0, G_0, B_0))/2;$$
$$R'=R_0+(W_0-\text{Average}(R_0, G_0, B_0))/2;$$
$$G'=G_0+(W_0-\text{Average}(R_0, G_0, B_0))/2; \text{ and}$$
$$B'=B_0+(W_0-\text{Average}(R_0, G_0, B_0))/2,$$

where $W_0$ is an achromatic component of the four-color image signals, $R_0$, $G_0$ and $B_0$ are chromatic components of the four-color signals, and Average(x, y, z) is defined as an average value of x, y and z.

18. The device of claim 14, wherein the data output unit outputs the optimized image signals by group of four optimized image signals.

19. A method of driving display device including a plurality of gate lines, a plurality of data lines, and a plurality of red, green, blue, and white pixels arranged in a matrix, the method comprising:

forming a first portion of each gate line and each data line having a first line width larger than a width of other portions of the respective gate line to form a gate electrode;

forming a second portion of at least one of the gate lines and the data lines located adjacent to the white pixel having a second line width larger than a width of other portions of the respective gate and data lines and smaller than the first line width of the respective gate and data lines;

converting three-color image signals into four-color image signals;

optimizing the four-color image signals;

converting the optimized four-color image signals into data voltages;

applying a gate voltage to the gate lines; and applying the data voltages to the data lines wherein the second line width of the second portion of at least one of the gate lines and the data lines of the white pixel is larger than the width of other portions of the respective gate and data lines of the other pixels.

* * * * *